UNITED STATES PATENT OFFICE 2,656,381

SECONDARY ALKYLSULFONAMIDO BENZOIC ACIDS

James Maurice Sprague, Drexel Hill, Pa., assignor to Merck & Co., Inc., a corporation of New Jersey No Drawing. Application October 21, 1950, Serial No. 191,499

6 Claims. (Cl. 260—518)

This invention relates to new compounds having the general formula

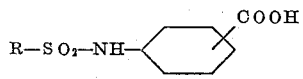

or the salt, ester or chemically equivalent derivatives thereof, in which R is a secondary-aliphatic hydrocarbon radical which can be an open-chain or cyclic secondary-aliphatic hydrocarbon radical advantageously containing up to 8 carbon atoms, and preferably containing from 5 to 8 carbon atoms.

Compounds of the above general formula are useful in maintaining high blood concentration of the penicillins and para-aminosalicylic acid, and those compounds wherein the carboxyl group is attached to the para-position of the benzene nucleus in relation to the sulfonamido nitrogen are particularly effective agents for this purpose.

All of the compounds embraced by the above structural formula are prepared by the same general procedure, namely, the condensation of a secondary-alkyl- or cycloalkyl sulfonyl halide with an amino benzoic acid ester in the presence of an acid binding solvent, such as pyridine or diethylaniline followed by hydrolysis of the resulting sulfonamido benzoic acid ester.

The sulfonyl halide intermediates, some of which are new substances, are advantageously prepared by one of two modifications of the isothiourea procedure. According to the usual isothiourea procedure, alkyl sulfonyl chlorides are prepared by the chlorination of isothiourea salts in aqueous solutions. This method is hazardous, however, since the nitrogen trichloride by-product of the reaction can cause severe explosions. Each of the modified procedures overcomes this hazard by avoiding the presence of nitrogen-containing compounds during the chlorination. One of the modified procedures involves the preparation of isothiouronium salts from an alkyl halide and thiourea. These salts are known to decompose in alkaline solution to give mercaptans, which, on chlorination in aqueous medium, yield sulfonyl chlorides. The introduction of this extra step gives a safe method for the preparation of the desired sulfonyl chlorides. The procedure according to this modification is graphically represented as follows:

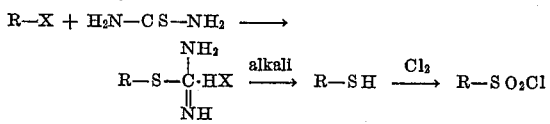

In most cases, the alkanesulfonyl chlorides could be distilled under diminished pressure, and, since the alkyl chlorides react readily with thiourea, a good yield of the sulfonyl chloride results on chlorination.

The procedure according to this modification requires that equimolar portions of the alkyl halide and thiourea be heated in alcohol. Advantageously, 1 ml. of alcohol per gram of alkyl halide is used. The heating is continued until very little or no black precipitate results when a 5% silver nitrate solution is added to a sample of the mixture that had been made basic with excess ammonium hydroxide. The alcohol is then removed and the residue dissolved in a minimum quantity of water. A solution of sodium hydroxide, advantageously a 40% solution, is added in small portions with stirring until no more cloudiness develops. An oil separates which is removed from the aqueous phase and dissolved in acetic acid, using about 150 to 300 mls. of acid per mole of reactant. Cracked ice, about 50 grams per mole of reactant, is added, the mixture chilled, preferably to about 0° and saturated with chlorine or bromine. Further additions of ice are made as needed to maintain the temperature at less than 15°. The sulfonyl chlorides are isolated by extracting the reaction mixture with ether, washing the extract with dilute sodium bisulfite solution and water and then drying over calcium chloride. The extract is then filtered and the ether removed by heating on a steam bath under reduced pressure for about 25 minutes. Generally, the sulfonyl halides can be further purified by distillation with only slight decomposition.

The second modification involves the preparation of isothiouronium salts by reaction of the appropriate alcohol with thiourea in the presence of concentrated hydrochloric or hydrobromic acid. This reaction can be graphically illustrated as follows:

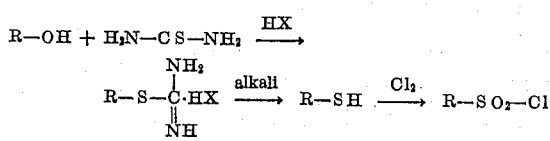

This reaction is advantageous from the standpoint of materials and cost since it avoids the use of the intermediate alkyl halide.

According to this second modification, a mixture of 400 mls. of the selected alcohol, 150 mls. of 48% hydrobromic acid and 45 grams (0.6 mole) of thiourea is heated on a steam bath. Heating is continued until the silver nitrateammonia test for thiourea is negative. The excess alcohol is then removed under reduced pressure (about 25 mm.) until the residue crystallizes or becomes quite viscous and completely water soluble. The residue is dissolved in water, sodium hydroxide added, the mercaptan removed and chlorinated as described above. The sulfonyl chlorides obtained can be distilled with substantially no decomposition.

The secondary-alkyl or cycloalkyl sulfonyl halide prepared by either procedure is added to a solution of an alkyl aminobenzoate dissolved in an acid binding solvent, such as pyridine. The reactants can be used in equimolecular quantities, although a preferable ratio of reactants is 1.2 to 1.5 parts of the amine to 1 part of sulfonyl halide; the latter ratio minimizes the formation of the disulfonyl derivative. The sulfonyl halide can be added rapidly, rarely requiring cooling. The reaction mixture is allowed to stand at room temperature for from about 3 to 15 hours. Concentrated hydrochloric acid, 36% (a volume equal to the quantity of acid binding solvent used) is added and the mixture diluted to about three times its volume with cold water or crushed ice. The crude carbalkoxy-alkanesulfonanilides thus obtained are low melting solids and generally separate at this point as oils that solidify upon standing. The crude ester is separated from the aqueous phase by filtration or decantation and then washed with cold water. The ester is heated for approximately 1 to 2 hours in about 2 equivalents (based on the amount of the starting materials) of dilute sodium hydroxide solution. After treating the solution with decolorizing carbon, the carboxy-alkanesulfonanilide is precipitated from the filtrate by making the solution acid to Congo red advantageously with concentrated hydrochloric acid. The products are purified by reprecipitation from an alkaline solution and recrystallization from aqueous alcohol, benzene or toluene.

The preparation of the new compounds of this invention is more completely illustrated by, but not restricted to, the following examples:

*Example I.—p - Carboxy - 1 - methyl - 1 - butanesulfonanilide*

(a) 127 gms. (0.85 mole) of 2-bromopentane and 57 gms. (0.75 mole) of thiourea were heated in 150 mls. of alcohol on the steam bath for 18 hours. At the end of this time no black precipitate resulted when a sample was added to ammoniacal silver nitrate. Solvent was removed on the steam bath with the aid of a water pump. The residue did not solidify even after standing in the refrigerator for five days. The crude S-2-pentyl isothiourea hydrobromide was dissolved in 500 mls. of water and 150 mls. of 40% sodium hydroxide solution then was added. The oil that separated was removed, washed with water and then dissolved in 200 mls. of acetic acid. Fifty gms. of cracked ice was added to the solution and the mixture was saturated with chlorine at 0° adding ice as needed to control the temperature. The crude 1-methyl-1-butanesulfonyl chloride was extracted with ether, the ether washed with dilute sodium bisulfite solution and water and then dried over calcium chloride for three hours. The yield of crude product was 100 gms. (70%). It can be distilled, boiling at 90–95° at 9 mm. pressure.

(b) To 95 gms. (0.57 mole) of ethyl p-aminobenzoate in 125 mls. of dry pyridine, 100 gms. (0.58 mole) of the crude sulfonyl chloride above was added. A little cooling was necessary only after about 15 minutes. After standing overnight at room temperature, 125 mls. of concentrated hydrochloric acid and 200 gms. of cracked ice were added. This precipitated an oil which could be crystallized from isopropyl ether giving p - carbethoxy - 1 - methyl - 1 - butanesulfonanilide, M. P. 86–88°.

(c) The crude oily ester from above was heated in 200 mls. of 10% sodium hydroxide solution on the steam bath for three-fourths of an hour. The solution was treated with decolorizing carbon and filtered. The product was precipitated from the filtrate by the addition of concentrated hydrochloric acid to the Congo red end point. After reprecipitation from sodium bicarbonate solution with acetic acid and recrystallization from benzene, the yield was 34.5 gms. of p-carboxyl-1-methyl-1-butanesulfonanilide, M. P. 119–121°.

*Example II.—p - Carboxy - 1 - ethyl - 1 - propanesulfonanilide*

(a) Molar quantities of 3-bromopentane (151 gms.) and thiourea (76 gms.) in 200 mls. of alcohol were heated for 18 hours on the steam bath. A negative thiourea test was obtained with ammoniacal silver nitrate. The alcohol was removed under reduced pressure. The residue did not solidify. The crude S-3-pentylisothiourea hydrobromide was dissolved in 400 mls. of water and 150 mls. of 40% sodium hydroxide were added. The oil that precipitated was separated and dissolved in 300 mls. of acetic acid. After the addition of 50 gms. of cracked ice, the solution was saturated with chlorine at 0 to 15° with additions of cracked ice as necessary to control the temperature. The suspension then was extracted with ether, the extract washed with dilute sodium bisulfite solution and water and then dried over calcium chloride for 3 hours. The solution then was filtered and the ether removed on the steam bath. The residue was distilled under reduced pressure giving 86 gms. (50%) of 1-ethyl-1-propanesulfonyl chloride boiling at 82–83° at 6 mm.

(b) The 86 gms. (0.5 mole) of distilled sulfonyl chloride was added to 82 gms. (0.5 mole) of ethyl p-aminobenzoate in 125 mls. of dry pyridine. The reaction was allowed to stand at room temperature overnight, then 125 mls. of concentrated hydrochloric acid was added and about 400 gms. of cracked ice. An oil separated which became quite viscous and could be crystallized from isopropyl ether giving p-carbethoxy-1-ethyl-1-propanesulfonanilide, M. P. 82–84°.

(c) The crude oily ester was heated on the steam bath in 400 mls. of 10% sodium hydroxide for 1 hour. The solution was treated with decolorizing carbon, and filtered. The product was precipitated from the filtrate by addition of an excess of concentrated hydrochloric aicd. Recrystallization from toluene gave 36.6 gms. of p-carboxy-1-ethyl-1-propanesulfonanilide, M. P. 125–127°.

*Example III.—p - Carboxy - 1,3 - dimethyl - 1-butanesulfonanilide*

(a) 60 gms. of thiourea (0.8 mole) and 138 gms. (0.83 mole) of 4-methyl-2-bromopentane were heated together in 150 mls. of alcohol for 18 hours on the steam bath. On removal of the solvent, the product crystallized. The S-(1,3-dimethyl-butyl)-isothiourea hydrobromide crystallized from water with a M. P. of 135–137°.

(b) The crude isothiourea salt was dissolved in 150 mls. of water and 100 mls. of 40% sodium hydroxide was added. The oil which separated was removed from the aqueous phase and dissolved in 125 mls. of acetic acid. About 50 gms. of cracked ice was added and the mixture saturated with chlorine at 0 to 15°. The sulfonyl chloride was extracted with ether and the ether dried over calcium chloride for three hours. The solution was filtered, the solvent removed and the residue distilled in vacuo. The yield was 56.2 gms. of 1,3-dimethyl-1-butanesulfonyl chloride boiling at 84–85° at 6 mm. (36%) with $n_D^{20}$ 1.4592.

(c) The 56 gms. (0.3 mole) of distilled sulfonyl chloride was added to 75 gms. (0.45 mole) of ethyl p-aminobenzoate in 100 mls. of dry pyridine. The reaction was allowed to stand overnight at room temperature after which 100 mls. of concentrated hydrochloric acid and about 400 gms. of cracked ice were added. This precipitated p-carbethoxy-1,3-dimethyl-1-butanesulfonanilide as an oil which soon solidified. A sample recrystallized to constant melting point from isopropyl ether melted at 103–105°.

(d) The crude ester from above was heated in 200 mls. of 10% sodium hydroxide solution on the steam bath for one hour. The solution was treated with decolorizing carbon and filtered. The filtrate was made acid to Congo red with concentrated hydrochloric acid which precipitated an oil that soon solidified. Repeated recrystallization from toluene gave 28 gms. of p-carboxy - 1,3 - dimethyl - 1 - butanesulfonanilide, M. P. 156–157.5.°

*Example IV.—p-Carboxy-1-methyl-1-pentanesulfonanilide*

(a) 1-methyl-1-pentanesulfonyl chloride was prepared in 60% yield from crude 2-bromohexane by a procedure similar to that described in step (a) of Example I. It boiled at 87–90° at 5 mm., $n_D^{20}$ 1.4622.

(b) To 62 gms. (0.37 mole) of ethyl p-aminobenzoate in 100 mls. of dry pyridine, 88 gms. (0.47 mole) of 1-methyl-1-pentanesulfonyl chloride was added. After standing overnight, 100 mls. of concentrated hydrochloric acid and 200 gms. of ice were added. An oil precipitated which solidified in 3 hours. Repeated recrystallization from isopropyl ether gave p-carbethoxy-1-methyl-1-pentanesulfonanilide, melting at 92–94°.

(c) Hydrolysis of the above ester by heating in 500 mls. of 10% sodium hydroxide for 1 hour yielded, after reprecipitation from sodium bicarbonate solution with acetic acid, and two recrystallizations from toluene, 17.3 gms. of p-carboxy-1-methyl-1-pentanesulfonanilide, M. P. 162–164°.

*Example V.—p-Carboxy-cyclohexanesulfonanilide*

(a) Cyclohexanesulfonyl chloride (32.5 gms., 0.18 mole), prepared by reacting cyclohexanol with thiourea as described by Sprague & Johnson, Journal of American Chemical Society, vol. 59, page 1837 (1937), was added to 50 gms. (0.3 mole) of ethyl p-aminobenzoate in 75 mls. of dry pyridine. After standing overnight at room temperature, 80 mls. of concentrated hydrochoric acid and 200 gms. of cracked ice were added. p-Carbethoxycyclohexanesulfonanilide precipitated as an oil which solidified almost immediately. A sample repeatedly recrystallized from alcohol or benzene melted at 151–153°.

(b) By heating the above crude ester in 250 mls. of 10% sodium hydroxide solution on the steam bath for one and one-half hours, it was hydrolyzed to the free acid. The solution was treated with decolorizing carbon and filtered. The product was precipitated by the addition of excess hydrochloric acid to the filtrate. The precipitate was dissolved in ethyl acetate and some insoluble material removed by filtration. The product was recovered by complete evaporation of the solvent. It was then reprecipitated from alkaline solution with acetic acid and crystallized from 30% aqueous alcohol. The yield was 16.7 gms. of p-carboxy-cyclohexanesulfonanilide, M. P. 174–176°.

*Example VI.—p-Carboxy-1-methyl-1-hexanesulfonanilide*

(a) 1-methyl-1-hexanesulfonyl chloride was prepared by a modification of the method described by Johnson and Sprague, Journal of American Chemical Society, vol. 58, page 1351 (1936), for alkyl sulfonyl halides. After heating 400 mls. of heptanol-2, 150 gms. of 48% hydrobromic acid and 45 gms. (0.6 mole) of thiourea on the steam bath for 24 hours, a sample was removed, made basic with ammonium hydroxide and 5% silver nitrate added. A brown precipitate indicated very little thiourea present. The solvent was removed from the bulk leaving a product with glue-like consistency which did not solidify overnight. This product was dissolved in 250 mls. of water and treated with 60 mls. of 40% sodium hydroxide. The oil that formed was separated, dissolved in 150 mls. of acetic acid and chlorinated at 0 to 15° in the presence of some ice. The oil was isolated as usual by ether extraction. The yield was 65 gms. of crude 1-methyl-1-hexanesulfonyl chloride. It distilled only with decomposition at 105° at 5 mm. pressure, $n_D^{20}$ 1.4592.

(b) 65 gms. (0.32 mole) of 1-methyl-1-hexanesulfonyl chloride and 79 gms. (0.48 mole) of ethyl p-aminobenzoate were condensed in 150 mls. of dry pyridine. After standing overnight the p - carbethoxy - 1 - methyl - 1 - hexanesulfonanilide was isolated by the addition of 150 mls. of concentrated hydrochloric acid and 300 gms. of ice. A sample repeatedly recrystallized from isopropyl ether melted at 103–105°.

(c) The above crude ester was hydrolyzed by heating in 400 mls. of 10% sodium hydroxide for one and one-half hours. Acidification of the solution precipitated the product which was purified by repeated recrystallization from toluene. The yield was 36 gms. of p-carboxy-1-methyl-1-hexanesulfonanilide, M. P. 171–173°.

*Example VII.—p-Carboxy-1-methyl-heptanesulfonanilide*

(a) 1-methyl-1-heptanesulfonyl chloride was prepared in 66% yield by the method described in step (a) of Example I. The boiling point was 94–98° at 2 mm., $n_D^{25}$ 1.4600.

(b) The 1-methyl-1-heptanesulfonyl chloride (70 gms., 0.33 mole) and ethyl p-aminobenzoate (79 gms., 0.48 mole) were condensed in 100 mls. of dry pyridine. The p-carbethoxyl-1-methyl-1-heptanesulfonanilide was isolated as an oil after the reaction had stood overnight by adding 100 mls. of concentrated hydrochloric acid and 250 gms. of cracked ice. A sample, when repeatedly recrystallized from isopropyl ether, melted at 86–88°, resolidifying and remelting at 95–97°. The melting point was unchanged by drying for 2 hours at 56° and 1 mm. over phosphorus pentoxide.

(c) p - Carboxy-1-methyl-1-heptanesulfonanilide was precipitated from 400 mls. of 10% sodium hydroxide, after heating the ester from one and one-half hours, by the addition of excess concentrated hydrochloric acid. Three recrystallizations gave 27.6 gms. of pure product, M. P. 161–163.5°.

*Example VIII.—p-Carboxy-1-propyl-1-butane-sulfonanilide*

(a) 1-propyl-1-butanesulfonyl chloride was prepared in 20% yield by the method described in step (a) of Example VI using di-n-propylcarbinol. It boiled at 90–92° at 2 mm., $n_D^{25}$ 1.4618.

(b) p - Carbethoxy - 1-propyl-1-butanesulfonanilide was prepared by condensing 16 g. (0.08 mole) of the above sulfonyl chloride with 16.5 g. (0.1 mole) of ethyl p-aminobenzoate in 25 mls. of pyridine. The crude ester was isolated in the usual way.

(c) By hydrolyzing the crude ester in 200 mls. of 5% sodium hydroxide solution and recrystallization from toluene, then from benzene, 2.1 g. of p-carboxy-1-propyl-1-butanesulfonanilide, M. P. 130–132°, was obtained.

All temperatures are in degrees centigrade.

While certain specific p-carboxy-(secondary-alkyl) sulfonanilides and certain specific p-carboxy-(cycloalkyl) sulfonanilides are described in the above examples, other carboxy-(secondary-alkyl) sulfonanilides and other carboxy-(cycloalkyl) sulfonanilides embraced within the scope of the generic formula above can be prepared by the process described wherein the carboxyl radical can be attached to the ortho-, meta- or para-position of the benzene nucleus in relation to the amino radical, and in which the secondary-alkyl radical or cycloalkyl radical can be replaced by any secondary-alkyl or cycloalkyl radical desired in the end product and containing from 3 to 8 carbon atoms. These additional compounds can be prepared by using the proper intermediate secondary-alkyl or cycloalkylsulfonyl halide and the proper aminobenzoate to yield the particular compound desired. Likewise, the various other reactants used in the process can be replaced by other chemically equivalent substances which one skilled in this art can readily select in order to facilitate the reaction of the different intermediates employed in making the desired end product.

Changes and variations from the foregoing illustrations can be made within the scope of the invention defined in the specification and claims annexed hereto.

What is claimed is:

1. A new carboxy-sulfonanilide having the general formula

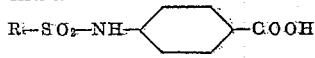

wherein R is a secondary-aliphatic hydrocarbon radical containing from 3 to 8 carbon atoms, and selected from the group consisting of an open-chain secondary-alkyl radical and a cycloalkyl radical.

2. The new compound, p-carboxy-1-ethyl-1-propanesulfonanilide having the structural formula

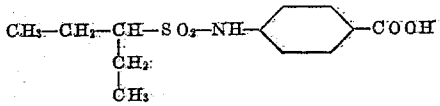

3. The new compound, p-carboxy-1-methyl-1-pentanesulfonanilide having the structural formula

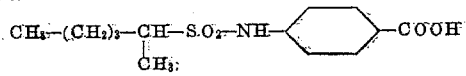

4. The new compound, p-carboxy-cyclohexanesulfonanilide having the structural formula

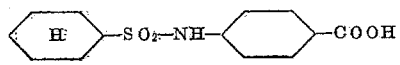

5. The new compound, p-carboxy-1-methyl-1-heptanesulfonanilide having the structural formula

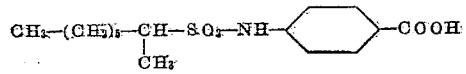

6. The new compound, p-carboxy-1,3-dimethyl-1-butanesulfonanilide having the structural formula

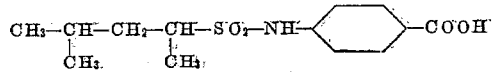

JAMES MAURICE SPRAGUE.

References Cited in the file of this patent

UNITED STATES PATENTS

| Number | Name | Date |
|---|---|---|
| 2,531,367 | Sprague | Nov. 21, 1950 |

FOREIGN PATENTS

| Number | Country | Date |
|---|---|---|
| 126,679 | Switzerland | Mar. 9, 1927 |

OTHER REFERENCES

Jones, Chem. Abstract, vol. 28, p. 2689 (1934).
Crosson et al., Chem. Abstracts, vol. 42, p. 284 (1948).